US010896067B2

(12) United States Patent
Vaddi et al.

(10) Patent No.: US 10,896,067 B2
(45) Date of Patent: Jan. 19, 2021

(54) DETERMINING THE COST OF CONTAINER-BASED WORKLOADS

(71) Applicant: HEWLETT PACKARD ENTERPRISE DEVELOPMENT LP, Houston, TX (US)

(72) Inventors: Kiran Kumar Vaddi, Karnataka (IN); Hardik Dhirendra Parekh, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 86 days.

(21) Appl. No.: 16/245,362

(22) Filed: Jan. 11, 2019

(65) Prior Publication Data
US 2020/0225990 A1 Jul. 16, 2020

(51) Int. Cl.
G06F 9/46 (2006.01)
G06F 9/50 (2006.01)
G06F 9/455 (2018.01)

(52) U.S. Cl.
CPC .......... *G06F 9/505* (2013.01); *G06F 9/45558* (2013.01); *G06F 9/5044* (2013.01); *G06F 9/5077* (2013.01); *G06F 9/45541* (2013.01); *G06F 2009/4557* (2013.01); *G06F 2009/45591* (2013.01); *G06F 2009/45595* (2013.01); *G06F 2209/504* (2013.01)

(58) Field of Classification Search
None
See application file for complete search history.

(56) References Cited

U.S. PATENT DOCUMENTS

| 9,965,261 | B2 | 5/2018 | Chen et al. |
| 2011/0252420 | A1* | 10/2011 | Tung .................. G06F 9/45533 718/1 |
| 2015/0271023 | A1 | 9/2015 | Anderson et al. |
| 2017/0257432 | A1* | 9/2017 | Fu ........................ H04L 67/2823 |
| 2017/0270449 | A1 | 9/2017 | Shrimali et al. |
| 2018/0060125 | A1 | 3/2018 | Bhimani et al. |
| 2018/0088993 | A1 | 3/2018 | Gerdesmeier et al. |

OTHER PUBLICATIONS

Garg, S. K. et al; "Workload Performance and Interference on Containers"; Aug. 2018; 3 pages.
(Continued)

*Primary Examiner* — Gregory A Kessler
(74) *Attorney, Agent, or Firm* — Jaffery Watson Mendonsa & Hamilton

(57) ABSTRACT

A method for managing container usage in a computing system, includes: gathering a plurality of infrastructure costs associated with a container; invoking an orchestration tool in a containerization system to determine a plurality of workload costs associated with the container; determining a container usage cost from the gathered infrastructure costs and the determined workload costs; and managing the container usage in the computing system based on the determined container usage cost. In some instances, the method is implemented in the functionality of a cost analyzer resident on a computing apparatus. In other instances, the method may be implemented in a computing system in which a cost analyzer operates.

20 Claims, 4 Drawing Sheets

(56) References Cited

OTHER PUBLICATIONS

Google Cloud; "Distributed Load Testing Using Kubernetes"; printed on Aug. 6, 2018 from webpage: https://cloud.google.com/solutions/distributed-load-testing-using-kubernetes; 11 pages.

Kubernets; "Moving a VM Based App to Kubernetes"; printed on Aug. 6, 2018 from webpage: https://console.bluemix.net/docs/tutorials/vm-to-containers-and-kubernetes.html#move-a-vm-based-application-to-kubernetes; 12 pages.

\* cited by examiner

US 10,896,067 B2

DETERMINING THE COST OF CONTAINER-BASED WORKLOADS

BACKGROUND

Many computing systems use "virtualization" to some degree. Virtualization in a computing system includes separating hardware and software by using software to, emulate hardware. There are several ways in which to do this. For instance, a computing system typically includes a number of physical devices, such as physical computing machines. The software running on the computing system may allocate the physical resources of those physical computing machines into "virtual machines" or "virtual networks".

A virtual machine might include processing resources from a first physical computing machine and memory resources from a second physical computing machine and might host portions of more than one virtual machine. "Virtual networks" may similarly be established by software allocation of portions of computing resources from multiple physical computing devices. So, a physical computing device might provide resources to more than one virtual machine or more than one virtual network. One example of this kind of virtualization is a hypervisor.

A different type of virtualization is known as "operating-system-level virtualization", or "containerization". One significant difference from the kind of visualization described immediately above is that, instead of cloning the kernel for each virtual machine, multiple virtual "containers" all share the same kernel. To do this, the containers can be useful in that they may be used to define separate, isolated computing environments within a larger computing system. Containers may be deployed in many types of computing environments and on everything from physical computers to virtual machines, un-virtualized (i.e., "bare-metal") servers, OpenStack cloud clusters, public instances, etc.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

While examples described herein are susceptible to various modifications and alternative forms, the drawings illustrate specific examples herein described in detail by way of example. It should be understood, however, that the description herein of specific examples is not intended to be limiting to the particular forms disclosed, but on the contrary, the intention is to cover all modifications, equivalents, and alternatives falling within the spirit and scope of the examples described herein and the appended claims.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

With the advent of containerization systems, many users are moving workloads running on virtual machines into containers. Cost is one of the factors for users to adopt this move. With the proliferation of container workloads, it becomes important to gain insights to the cost of the container workload so that further decisions on placement and optimizations can be done.

The present disclosure provides a method, a computing apparatus, and a computing system for determining a more comprehensive container cost than is currently available. Conventional practice assigns container cost based solely on infrastructure costs provided by the platform operator. Infrastructure costs include things such as hardware, amortization, power, cooling, real estate, and support costs. These are static costs and do not reflect the cost of operations performed on the infrastructure. The present disclosure assigns container cost by including not only infrastructure costs, but also workload costs. Workload costs include things such as central processing unit use, memory use, storage use, public Internet Protocol ("IP") usage, and external load balancer costs. These are dynamic costs that vary with the workload being processed. The workload parameters can be obtained through the operating software of the containerized system and their associated costs determined therefrom.

Figure 1:
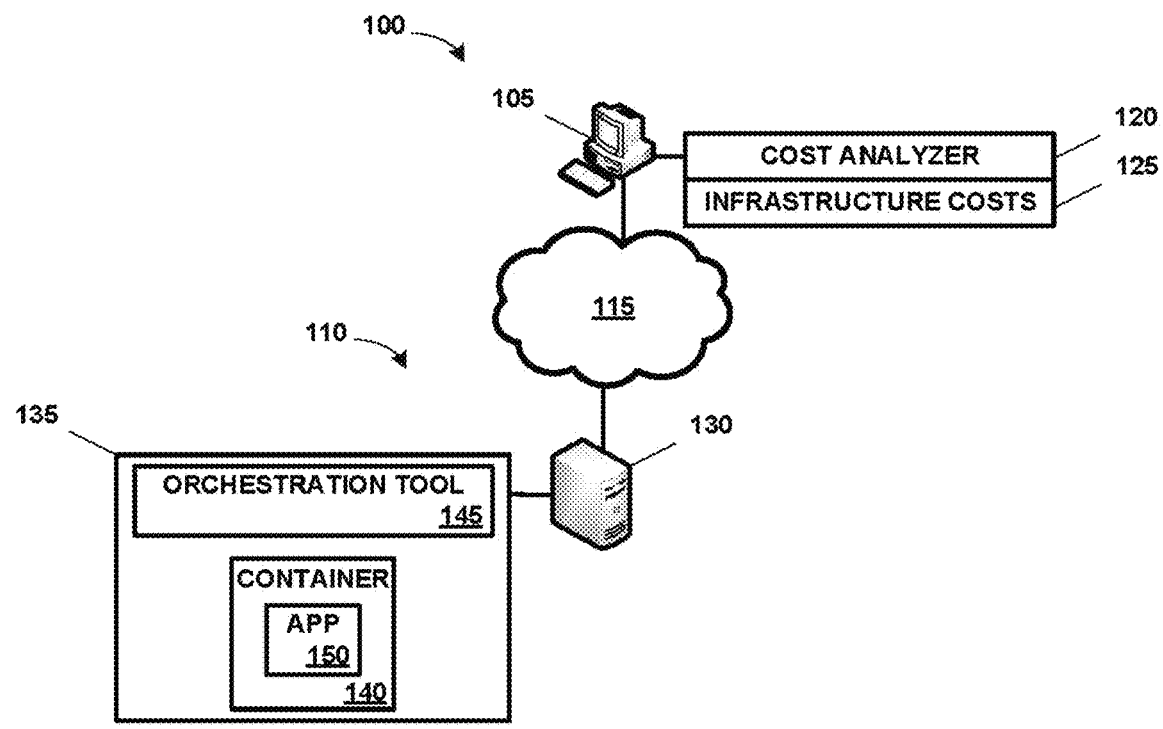
FIG. 1 depicts selected portions of a computing system in accordance with one or more examples of the subject matter claimed below.

Turning now to the drawings, FIG. 1 illustrates selected portions of a computing system 100 in accordance with one or more examples of that which is claimed below. The computing system 100 includes a computing apparatus 105, a computing resource 110, and a network 115 over which the computing apparatus 105 and computing resource 110 communicate. A cost analyzer 120 and a data file populated with infrastructure costs 125 reside on the computing apparatus 105. The computing resource 110 includes a server 130 hosting at least part of an orchestrated computing environment 135 including a container 140 and an orchestration tool 145.

The orchestration tool 145 is a part of and defines the orchestrated computing environment 135. The manner in which the orchestration tool 145 does this will be implementation specific depending on the implementation of the orchestrated computing environment 135. One particular implementation will be discussed further below. The orchestration tool 145 instantiates and manages the container 140 in which an application ("APP") 150 executes. The application 150 may also be, in other examples, a process, a service, etc.

The computing apparatus 105 is, in this particular example, an administrative console for the computing system 100. However, other examples may implement this feature in other ways. The cost analyzer 120 is an application but in other examples may be some other type of software component such as web service or a daemon. The infrastructure costs 125 with which the data file is populated are known costs and may include capital expenditure costs and operational expenditure costs. Capital expenditure costs may include, for instance, the costs of the hardware, real estate, amortization, power, cooling, and support costs. Operational expenditure costs may include, for instance, costs such as power, maintenance, and personal costs.

Figure 2:
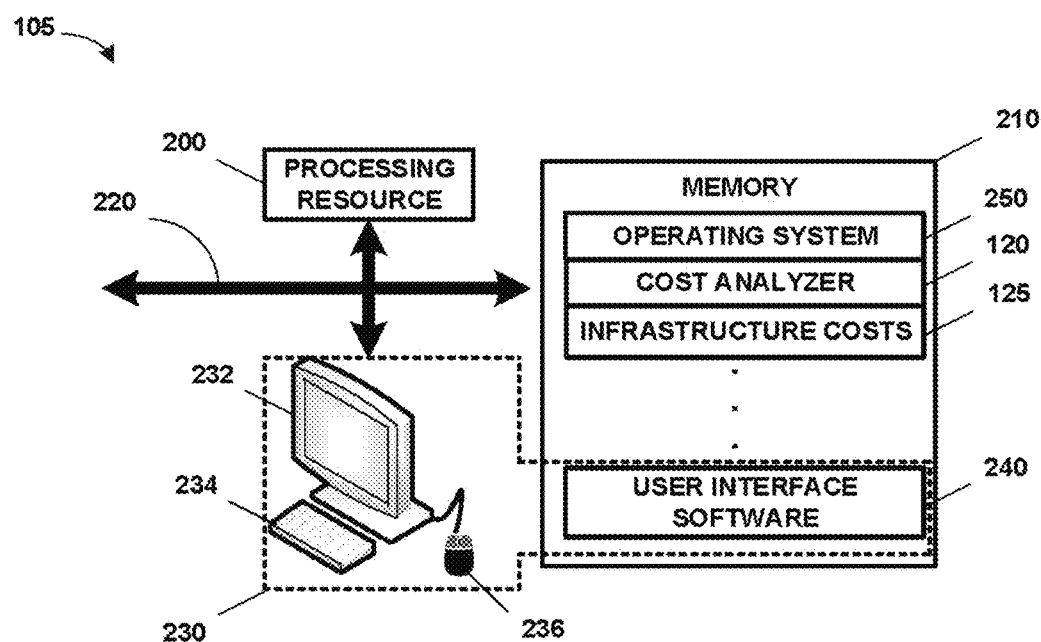
FIG. 2 depicts selected portions, of the hardware and software architecture of a computing apparatus in accordance with one or more examples of the subject matter claimed below.

FIG. 2 illustrates selected portions of the hardware and software architecture of the computing apparatus 105 in accordance with one or more examples of the subject matter claimed below. The computing resource 105 includes a processing resource 200, a memory 210, a bus system 220 over which the processing resource 200 and memory 210 communicate, and a user interface 230. The user interface 230 may include, for instance, user interface software ("UIS") 240 residing on the memory 210, a display 232, peripheral I/O devices such as a keypad or keyboard 234 and a mouse 236.

The processing resource 200 may be a processor, a processing chipset, or a group of processors depending upon the implementation of the computing apparatus 105. The memory 210 may include some combination of read-only memory ("ROM") and random-access memory ("RAM") implemented using, for instance, magnetic or optical memory resources such as magnetic disks and optical disks. Portions of the memory 210 may be removable. The bus system 220 may be any suitable bus system employing any suitable bus protocol.

The memory 210 is also encoded with an operating system 250. The cost analyzer 120 is invoked by a user through the user interface 230, the operating system 250 upon power up, reset, or both, or through some other mechanism depending on the implementation of the operating system 250. The cost analyzer 120, when invoked, performs a method 300 shown in FIG. 3 and discussed below.

Figure 3:
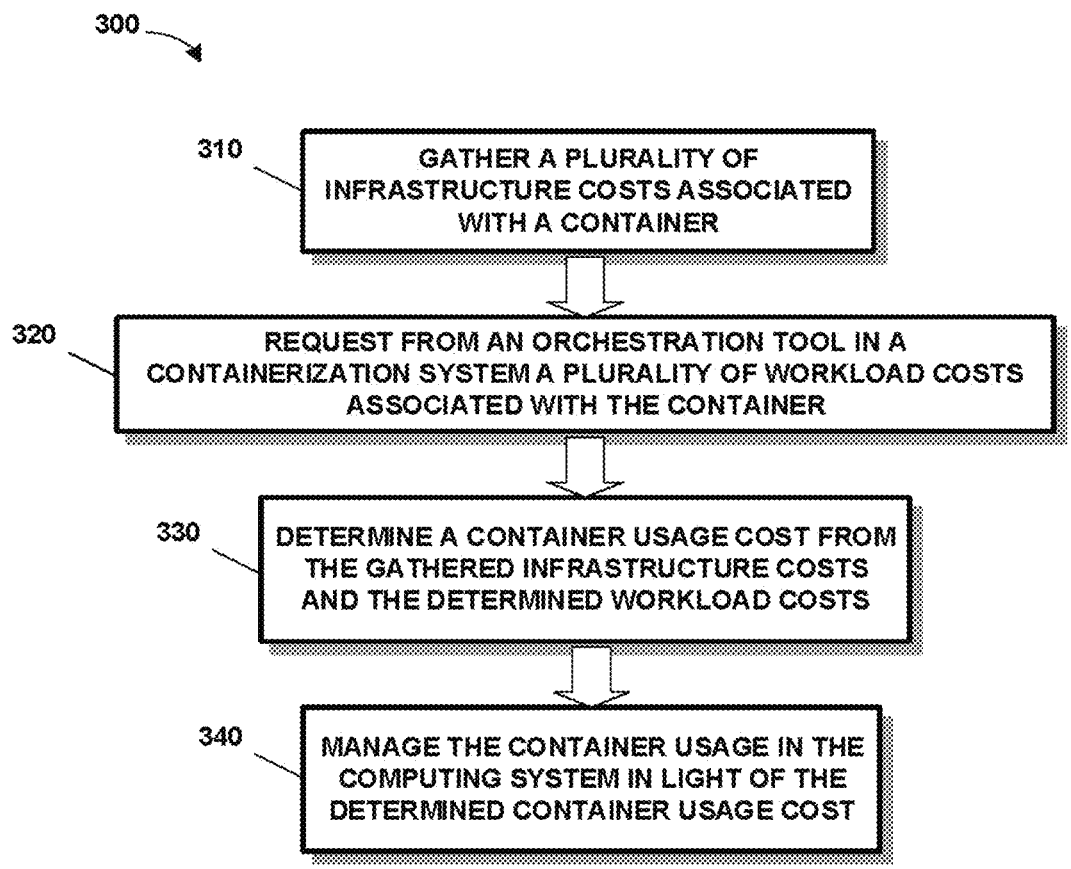
FIG. 3 illustrates a method utilized by the computing system of FIG. 1-FIG. 2 in accordance with one or more examples of the subject matter claimed below.

FIG. 3 illustrates a method 300 for use in managing container usage in a computing system, such as computing system 100. The method 300 begins by gathering (at 310) a plurality of infrastructure costs associated with a container. Infrastructure costs are typically known to the owner, administrator, or operator of the computing system 100 and can be gathered into a data file such as the data file in FIG. 1 into which the infrastructure costs 125 are gathered. Thus, in the example of FIG. 1, the cost analyzer 120 can gather the plurality of infrastructure costs by accessing the data file containing the infrastructure costs 125. However, other examples may gather the infrastructure costs in other ways.

The method 300 continues by requesting (at 320) from an orchestration tool in a containerization system a plurality of workload costs associated with the container. For example, where the computing system 100 employs a Representational State Transfer ("REST") protocol, the request may be made by invoking the REST Application Program Interface ("API") (not separately shown) to provide the requested information. This may be done, for instance, while a user is deploying an application across the computing system 100.

In operation, the container 140, shown in FIG. 1, executes, for instance, an application 150. The orchestration tool 145 tracks a number of parameters pertaining to the workload imposed by the execution of the application 150 on the computing resources of the container 140. These parameters may include usage of, for instance, central processing unit(s), memory, storage, public IP, and an external load balancer. The parameters may be requested by sending a request for a report for certain parameters of interest. The parameters can then be associated with unit costs (e.g., by multiplication) to arrive at workload costs.

The method 300 in FIG. 3 then continues by determining (at 330) a container usage cost from the gathered infrastructure costs and the determined workload costs. In the illustrated example, the gathered infrastructure costs and determined workload costs are separately arrived at and then summed. However, other examples may sum the gathered infrastructure costs and determined workload costs simultaneously. Similarly, the timing for the gathering of the infrastructure costs (at 310) and determining the workload costs (at 320) may be implementation specific. For instance, the workload costs may be determined (at 320) on demand of the cost analyzer 120, shown in FIG. 1. Or, the workload costs may be determined (at 320) continuously during operations such that they are available when the cost analyzer 120 needs them. Similarly, the infrastructure costs may be gathered (at 310) on startup or on demand from the cost analyzer 120.

The process 300 then manages (at 340) the container usage in the computing system based on the determined container usage cost. The nature of the management will depend on factors such as the action to be undertaken and the state of the computing system 100, shown in FIG. 1. For example, on deployment of a new application, management (at 340) may include whether the new application should be deployed to an existing container 140 or to instantiate a new container 140 into which the new application may be deployed. Management may include allocation of computing resources to an existing container 140 or reallocation of computing sources away from an existing container 140 to another existing container 140 or new container 140.

Those in the art having the benefit of this disclosure will appreciate that most examples will typically include greater complexity than is shown in FIG. 1-FIG. 3. One particular example will now be discussed that includes additional levels of detail and complexity than is shown in FIG. 1-FIG. 3.

Figure 4:
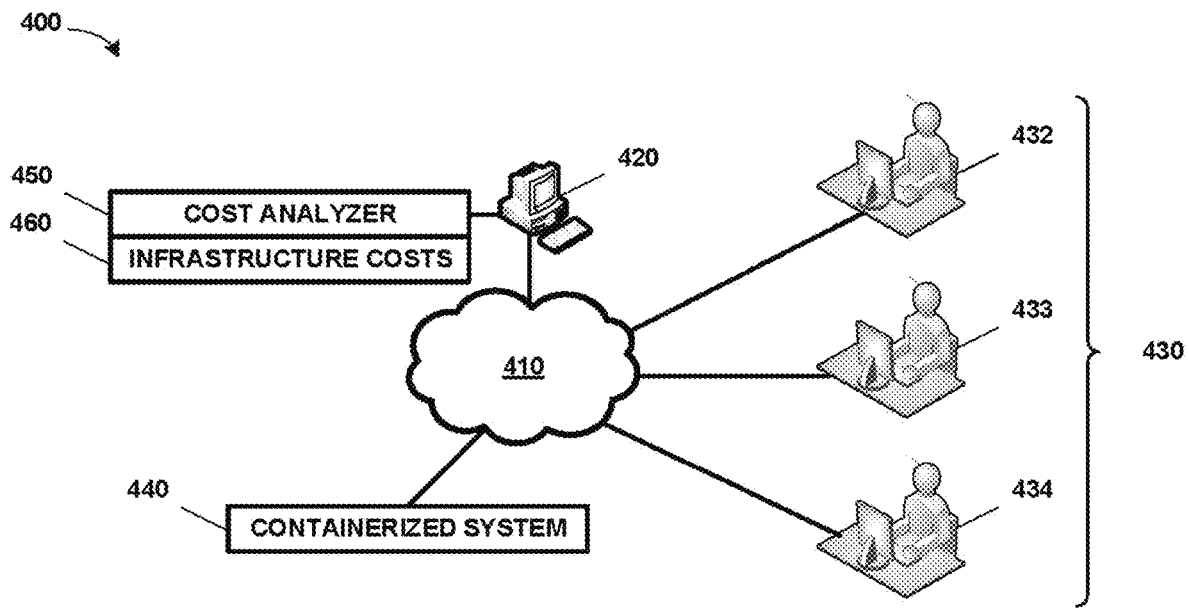
FIG. 4 depicts selected portions of a computing system in accordance with one or more examples of the subject matter claimed below.

FIG. 4 illustrates a computing system 400, which is housed at least partially in a computing facility such as a data center not otherwise shown. Data centers are repositories for computing facilities used to store and manage large amounts of data. In large data centers, the computing facilities may include computing systems having large and complex hardware and software architectures. The data center may also include support systems such as air conditioning/climate control systems, fire suppression/smoke detection, secure entry and identification and raised floors for easy cabling and water damage prevention. These support systems are not germane to the present disclosure and so are not illustrated for the sake of clarity and so as not to obscure that which is claimed below.

The computing system 400 may be a private or public network 410. The network 410 is, in this example, a cloud. If the computing system 400 is a private network and housed entirely within a computing facility, the ports (not shown) of the physical devices may be locked down to help prevent unauthorized intrusion of external origination. However, where the network 410 includes portions of, or communicates over, a public network, the ports may be unlocked to facilitate such communication. One public network that might be included in whole or in part is the Internet and, in particular, the World Wide Web portion of the Internet. In such examples, the ports would need to be unlocked to permit interfacing with the public network.

The computing system 400 includes, as part of the public network 410, one or more administrative consoles 420, a plurality 430 of users 432-434, and a containerized system 440. The users 432-434 may be organized socially and technically into teams or business units sharing the network 410 and the containerized system 440. A cost analyzer 450 and a data file populated with infrastructure costs 460 reside on the administrative console 420. Note that the cost analyzer 450 and the data file may reside elsewhere in the network 410, including the containerized system 440.

Figure 5:
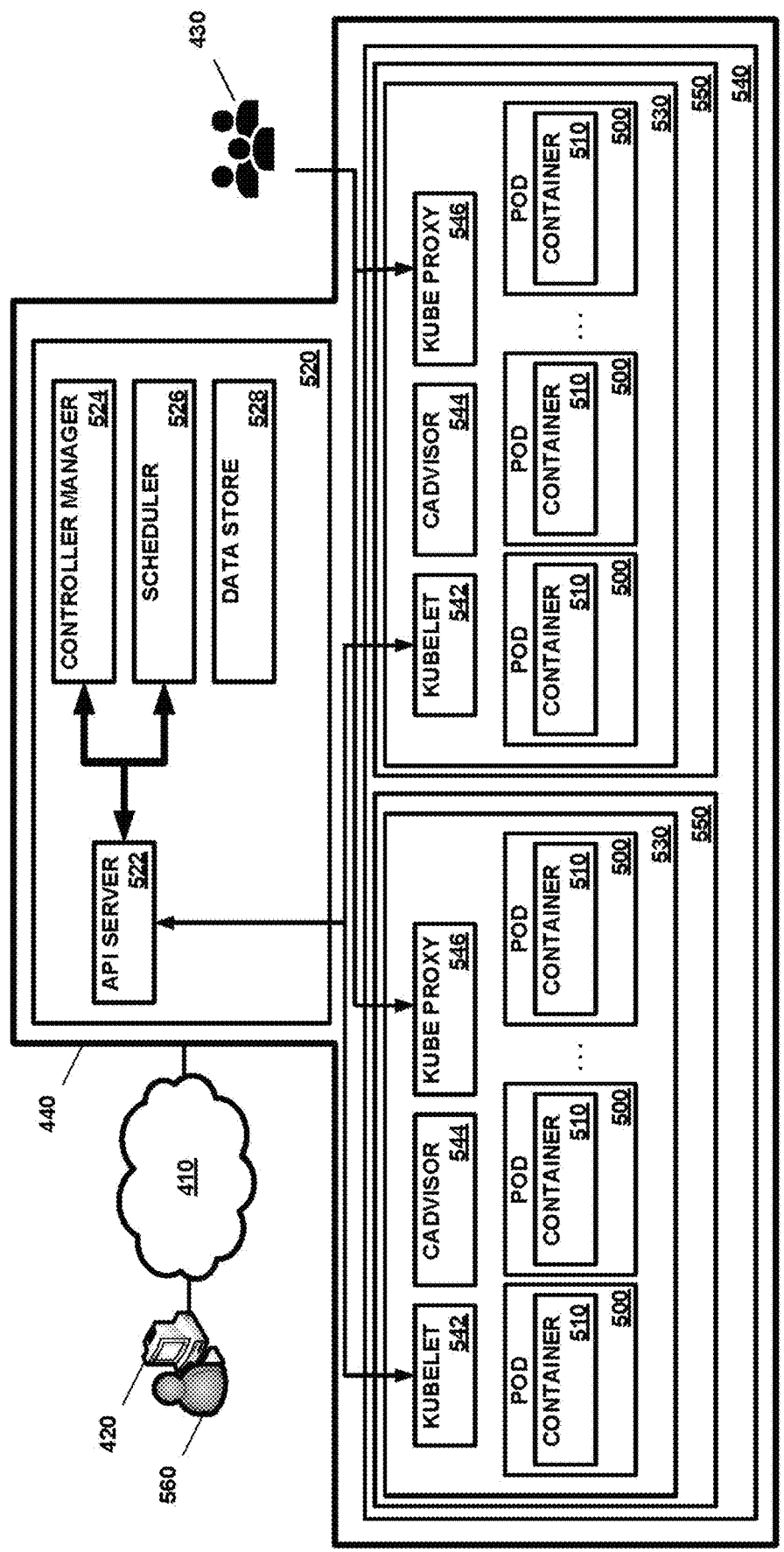
FIG. 5 depicts selected portions of the containerized system of the computing system in FIG. 4.

Referring now to FIG. 5, in the illustrated embodiment, the containerized system 440 is a Kubernetes containerization system. Kubernetes is an open source management system for container virtualization that works on a pod system. Each pod 500 includes at least one, and typically a plurality, of containers 510 all of which share the same host. That is, the containers 510 of a pod 500 are all on the same host 530-typically a virtual machine. Each of the containers 510 shares resources within the pod 500. The host 530 is grouped together with other hosts of containers 510 and pods 500 into a unit called a cluster 540. Each container 510 in the cluster 540 is assigned a unique IP address within the cluster 540.

Thus, each cluster 540 includes at least one node 550, each node 550 including at least one pod 500, each pod 500 including at least one container 510. In addition to the pods 500 of containers 510, each node 550 includes a Kubelet 542, a cAdvisor 544, and a Kube-proxy 546. The Kubelet 542 performs a number of functions, among which include (1) monitoring the status and communicating it to the controller 520, discussed further below, and (2) starting, stopping, and maintaining applications as directed by the controller 520. The cAdvisor 544 monitors and gathers resource usage and performance metrics for the pod 500 such as CPU, memory, file and network usage for the containers 510. The Kube proxy 546 implements a network proxy and a load balancer, neither of which is separately shown, and supports service abstraction along with other networking operation.

The containerization system also includes a pod controller 520 in addition to at least one node 550. The controller 520 further includes an application program interface ("API") server 522, a controller manager 524, a scheduler 526, and a data store 528. The data store 528 is a persistent, lightweight, distributed key-value data store. It contains configuration data for the cluster, the configuration data representing the overall state of the cluster 540 at any particular time. The scheduler 526 assigns pods 500 for executing processes, applications, etc. and tracks resource requirements, resource availability, user-provided constraints, and policy directives for the containers 510 and the pod 500 generally. The controller manager 524 is a process that manages a variety of other controllers (not shown) and creates, updates, and deletes resources that those controllers manage. The API server 522 provides the communications interface both, internally between among the nodes 550 and the controller 520 as well as between the containerized system 440 and the rest of the computing system 400. The pod controller then manages the pods 500, and the pods 500 can work together to provide services.

Thus, Kubernetes clusters 550 are built using virtual machines such as the hosts 550 on a public or private cloud 410, shown in FIG. 4. Kubernetes clusters 540 are shared by multiple teams and business units. Each team/unit typically uses their own namespace in Kubernetes containerized system 440 to deploy their containers 510. In conventional practice, the administrators 560 of the Kubernetes cluster and IT operations teams do not get insights into the full cost incurred by each team/unit.

This information would be useful so that business units can be charged according to their usage. As noted above, the present disclosure provides a technique for determining a fuller cost of operations conducted in containers 510 in pods 500. Knowing the full cost will enable, for instance, determinations as to alternative locations for deploying the workloads. One might choose different clouds 410 for creating nodes 550 (virtual machines) for the cluster 540. Or, one might use native Kubernetes clusters 540 (like EKS, GCloud K8S, etc.).

Figure 6:
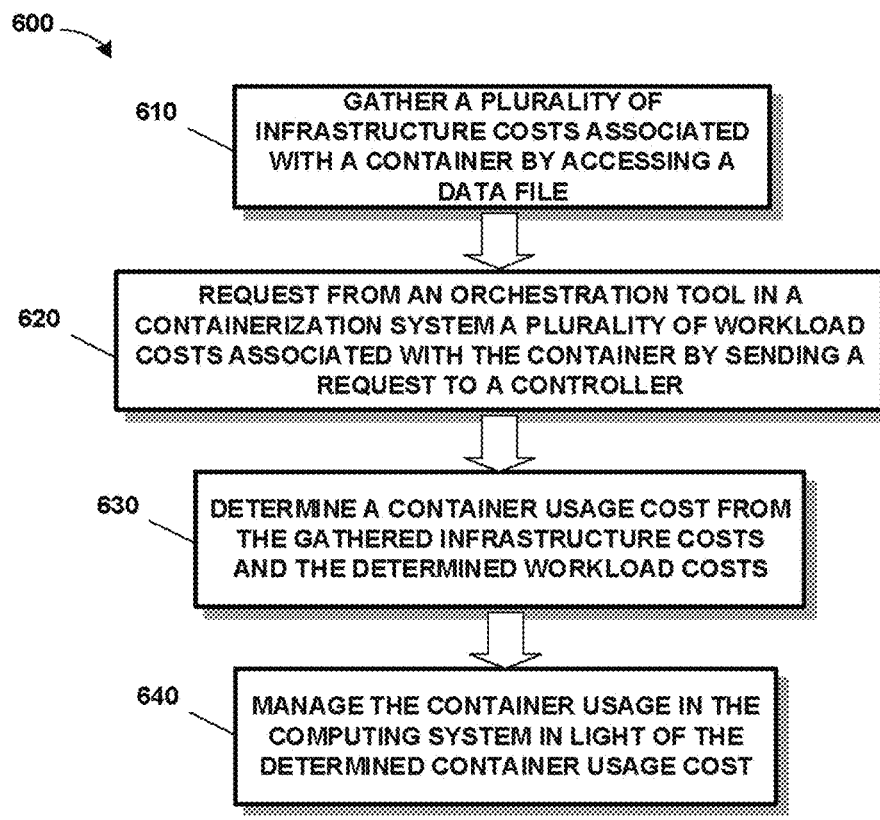
FIG. 6 illustrates one particular method utilized by the computing system of FIG. 4-FIG. 5 in accordance with one or more examples.

The example of FIG. 4-FIG. 5 implements the method 600 of FIG. 6. The method 600 begins with the cost analyzer 450 gathering (at 610) a plurality of infrastructure costs associated with a container 510 by accessing the infrastructure costs 460. The cost analyzer 450 then requests (at 620) from an orchestration tool in a containerization system a plurality of workload costs associated with the container. In the illustrated example, the cost analyzer 450 does this by sending a request to the controller 520 through its API server 522. The API server 522 can retrieve this information from the data store 528 or can, poll the clusters 540. The Kubelet 542 of the cluster 540 may already have that information in a datastore (not shown) or may request the information from the cAdvisor 544. If the Kubelet 542 already has that information, it may also update the information by requesting information from the cAdvisor 544.

The method 600 in FIG. 6 then continues by determing (at 630) a container usage cost from the gathered infrastructure costs and the determined workload costs. Example calculations are provided below. The process 600 then manages (at 640) the container usage in the computing system based on the determined container usage cost.

In the example of FIG. 4-FIG. 5, the Kubernetes containerized system 440 is deployed on the public cloud 410 and so will use following resources: a load balancer, a persistent volume, a public IP address, and compute resources. In this example, it is assumed that the load balancer is provided as an infrastructure service. Since the load balancer cost is not dependent on workload, it is not considered in the cost calculation. The public IP address is a fixed cost, so the cost, therefore, can be added to workload if service specification has requested for load balancer IP. This might include, for instance, determinations as to alternative locations for deploying the workloads. For storage, a general-purpose storage such as Elastic Block Storage ("EBS") storage that does not include input/output operations ("iops") cost. Most clouds have fixed price per gigabyte (GB) volume that can be added as cost to workload if deployment specification has requested persistence volume.

For compute resources calculation, the instance_type and node capacity may be obtained using the command kubectl get node <node names>. From instance_type, one can determine how much cloud is charging for that node. Note: The "total node cost" is derived based on the hardware costs, amortization, power, cooling, real estate and support costs. This solution assumes that this cost is determined and is available to perform the container cost calculation. Following is a calculation for POD costing $$\text{1 node can handle 110 PODS} \tag{1}$$

$$\text{minimum CPU} = \text{Node CPU}/110 \tag{2}$$

$$\text{minimum memory} = \text{Node Memory}/110 \tag{3}$$

$$\text{minimum CPU cost} = (\text{minimum CPU}/\text{total node CPU}) * \text{total node cost} \tag{4}$$

$$\text{minimum CPU cost} = (\text{minimum memory}/\text{total node memory}) * \text{total node cost} \tag{5}$$

$$\text{Pod CPU Cost} = (\text{Requested CPU}/\text{minimum CPU}) * \text{minimum CPU cost} \tag{6}$$

$$\text{Pod memory cost} = (\text{Requested memory}/\text{minimum memory}) * \text{minimum memory cost} \tag{7}$$

The calculation may continue using the following pseudo-code:

Pod compute cost="Pod memory cost "if >"Pod CPU Cost", else "Pod CPU Cost"

total workload/pod cost=Pod compute resource cost +Pod public ip cost if requested+POD persistence volume cost if requested.

This calculation can be further used to determine the cost of the entire application. For instance, if may be used where Helm charts deploy an application which consist of multiple pods.

Following is a sample calculation for Amazon EC2 instances in an Amazon Web Services ("AWS") Cloud using information from https://aws.amazon.com/ec2/pricing/on-demand/and https://aws.amazon.com/ebs/pricing/. For example, consider t3.medium as instance type which is having 2 vCPU with 4 GB of memory: $0.0416 per hour. The Kubernetes documentation states that 1 node can handle 110 PODS. Thus:

$$\text{minimum CPU} = 2/110 = 0.0181818 \tag{8}$$

$$\text{minimum memory} = 4/110 = 0.0363636 \tag{9}$$

$$\text{minimum CPU cost per hour} = (0.0181818/2) * 0.0416 = \$0.0003781 \text{ per hour} \tag{10}$$

$$\text{minimum memory cost} = (0.0363636/4) * 0.0416 = \$0.0003781 \text{ per hour} \tag{11}$$

For simplicity, suppose requested CPU is 1 vCPU and requested memory is 2 GB. Then:

$$\text{Pod CPU Cost} = (1/0.0181818) * 0.000378 = \$0.0207999 \text{ per hour} \tag{12}$$

$$\text{Pod memory cost} = (2/0.0363636) * 0.0003781 = 0.0207955 \text{ per hour} \tag{13}$$

So, Pod compute cost will be:

"Pod memory cost" if>than "Pod CPU Cost", else "Pod CPU Cost"

From above condition Pod cost will be: $0.0207999 per hour. So total workload/pod cost=$0.0207999 per hour ++ Pod public ip cost if requested (roughly $0.01 per hour) +POD persistence volume cost if requested.

The examples discussed herein are, as noted above, implemented on a Kubernetes containerization system, such as Kubernetes containerization system 440. However, the subject matter claimed below is not limited for use on Kubernetes containerization systems and may be used in other containerization systems. Kubernetes is, more particularly, an orchestration tool used to define Container Orchestration Environment ("COE"). The open source container platform Docker includes a COE called Docker Swarm. Other examples of COEs with which the claimed subject matter may be implemented include DC/OS, Rancher, Container X, RedHat OpenShift, Pivotal Cloud Foundry, and Mesos, all of which are commercially available. Those in the art having the benefit of this disclosure may appreciate still other COEs with which the presently disclosed technique may be used.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in, mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular examples disclosed above are illustrative only, as examples described herein may be modified and practiced in different but equivalent manners apparent to those skilled in the art having the benefit of the teachings herein. Furthermore, no limitations are intended to the details of construction or design herein shown, other than as described in the claims belong. It is therefore evident that the particular examples disclosed above may be altered or modified and all such variations are considered within the scope and spirit of the appended claims. Accordingly, the protection sought herein is as set, forth in the claims below.

What is claimed is:

1. A method for managing container usage in a computing system, comprising:
   gathering a plurality of infrastructure costs associated with a container, wherein the plurality of infrastructure costs represent known static costs and include capital expenditure costs and operational expenditure costs;
   determining a plurality of workload costs associated with the container by requesting from an orchestration tool in a containerization system a plurality of workload parameters associated with the container, wherein the plurality of workload costs represent dynamic costs that vary with a workload being processed by the container and include costs associated with usage of resources of the computing system by the container;
   determining a container usage cost from the gathered infrastructure costs and the determined workload costs; and
   programmatically managing the container usage in the computing system based on the determined container usage cost.

2. The method of claim 1, wherein gathering the plurality of infrastructure costs includes accessing a data file containing the infrastructure costs.

3. The method of claim 1, wherein gathering the infrastructure costs includes determining the capital expenditure cost and the operational expenditure costs.

4. The method of claim 1, wherein determining the workload costs includes determining central processing unit use costs, memory use costs, and storage use costs.

5. The method of claim 1, further comprising determining a container usage cost for a plurality of containers to determine a cumulative container usage cost.

6. The method of claim 5, wherein the plurality of containers comprise a totality of containers deployed on a node and the cumulative container usage cost represents a pod usage cost.

7. The method of claim 5, wherein the plurality of containers comprise the totality of containers deployed in the processing of an application and the cumulative container usage cost represents an application usage cost.

8. The method of claim 1, wherein:
   the containerization system is a Kubernetes containerized system; and
   the container is a part of the Kubernetes containerized system.

9. A computing apparatus, comprising:
   a processing resource; and
   a non-transitory computer-readable medium, coupled to the processing resource, having stored therein instructions that when executed by the processing resource cause the processing resource to perform
   a method comprising:
      gathering a plurality of infrastructure costs associated with a container, wherein the plurality of infrastructure costs represent known static costs and include capital expenditure costs and operational expenditure costs;
      determining a plurality of workload costs associated with the container by requesting from an orchestration tool in a containerization system a plurality of workload parameters associated with the container, wherein the plurality of workload costs represent dynamic costs that vary with a workload being processed by the container and include costs associated with usage of resources of the computing system by the container;
      determining a container usage cost from the gathered infrastructure costs and the determined workload costs; and
      programmatically managing the container usage in the computing system based on the determined container usage cost.

10. The computing apparatus of claim 9, wherein gathering the plurality of infrastructure costs includes accessing a data file containing the infrastructure costs.

11. The computing apparatus of claim 9, wherein the method further comprises determining a container usage cost for a plurality of containers to determine a cumulative container usage cost.

12. The computing apparatus of claim 11, wherein the plurality of containers comprise a totality of containers deployed in the processing of an application and the cumulative container usage cost represents an application usage cost.

13. The computing apparatus of claim 9, wherein said determining a plurality of workload costs is performed continuously during operation of the container.

14. The computing apparatus of claim 9, wherein said determining a plurality of workload costs is performed on demand.

15. The computing apparatus of claim 9, wherein said programmatically managing the container usage comprises:
   responsive to deployment of a new application, determining whether the new application will be deployed to the container or will be deployed to a newly instantiated container;
   allocating additional resources to the container; or
   reallocating resources associated with the container to another container.

16. A computing system, comprising:
   a plurality of computing resources;
   a container orchestration environment implemented on the computing resources, the container orchestration environment including:
      an orchestration tool; and
      a plurality of containers; and
   a computing apparatus including a processing resource and a non-transitory computer-readable medium, coupled to the processing resource, having stored therein instructions that when executed by the processing resource cause the processing resource to perform
   a method comprising:
      gathering a plurality of infrastructure costs associated with a container of interest of the plurality of containers, wherein the plurality of infrastructure costs represent known static costs and include capital expenditure costs and operational expenditure costs;
      determining a plurality of workload costs associated with the container of interest, wherein the plurality of workload costs represent dynamic costs that vary with a workload being processed by the container of interest and include costs associated with usage of the plurality of resources by the container of interest;
      determining a container usage cost from the gathered infrastructure costs and the determined workload costs; and
      programmatically managing the container usage in the computing system based on the determined container usage cost.

17. The computing system of claim 16, wherein gathering the plurality of infrastructure costs includes accessing a data file containing the infrastructure costs.

18. The computing system of claim 16, wherein the method further comprises determining a container usage cost for the plurality of containers to determine a cumulative container usage cost.

19. The computing system of claim 18, wherein the plurality of containers comprise a totality of containers deployed in the processing of an application and the cumulative container usage cost represents an application usage cost.

20. The computing system of claim 16, wherein:
the containerization system is a Kubernetes containerized system; and
the container is a part of the Kubernetes containerized system.

* * * * *